United States Patent
Gao et al.

(10) Patent No.: US 10,274,781 B2
(45) Date of Patent: Apr. 30, 2019

(54) DISPLAY DEVICE AND CONTROLLING METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jian Gao, Beijing (CN); Xiaochuan Chen, Beijing (CN); Wenqing Zhao, Beijing (CN); Qian Wang, Beijing (CN); Pengcheng Lu, Beijing (CN); Ming Yang, Beijing (CN); Lei Wang, Beijing (CN); Rui Xu, Beijing (CN); Xiaochen Niu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 119 days.

(21) Appl. No.: 15/539,025

(22) PCT Filed: Nov. 24, 2016

(86) PCT No.: PCT/CN2016/107084
§ 371 (c)(1),
(2) Date: Jun. 22, 2017

(87) PCT Pub. No.: WO2017/118234
PCT Pub. Date: Jul. 13, 2017

(65) Prior Publication Data
US 2017/0371203 A1    Dec. 28, 2017

(30) Foreign Application Priority Data
Jan. 8, 2016   (CN) .......................... 2016 1 0012078

(51) Int. Cl.
*G02F 1/1335*    (2006.01)
*G02F 1/13357*   (2006.01)
*G02F 1/13*      (2006.01)

(52) U.S. Cl.
CPC ...... *G02F 1/133528* (2013.01); *G02F 1/1323* (2013.01); *G02F 1/1336* (2013.01);
(Continued)

(58) Field of Classification Search
CPC ........ G02B 5/045; G02B 5/04; G02B 6/0035; G02B 6/003; G02B 6/00; G02B 6/0053;
(Continued)

(56) References Cited

U.S. PATENT DOCUMENTS

2003/0067565 A1    4/2003  Yamamura
2007/0081110 A1*   4/2007  Lee ..................... G02B 6/0053
                                                         349/61
(Continued)

FOREIGN PATENT DOCUMENTS

CN    1412609 A      4/2003
CN    104020600 A    9/2014
(Continued)

OTHER PUBLICATIONS

ISR and WO dated Mar. 2, 2017; PCT/CN2016/107084.

*Primary Examiner* — Thoi V Duong
(74) *Attorney, Agent, or Firm* — Ladas & Parry LLP

(57) ABSTRACT

A display device and a controlling method are disclosed to achieve peep-proof effect while increasing utilization rate of light. The display device includes a display panel including a first substrate, a second substrate and a plurality of display units, wherein a first light source is disposed on one side of the first substrate; light emitted by the first light source is incident onto the first substrate and propagated in the first substrate in a manner of total reflection; and a light adjusting
(Continued)

structure is disposed on a surface of the first substrate close to the second substrate, and is configured to reduce a divergence angle of light emitted by each of the display units of the display panel.

11 Claims, 3 Drawing Sheets

(52) U.S. Cl.
CPC .... *G02F 1/13362* (2013.01); *G02F 1/133615* (2013.01); *G02F 2001/13356* (2013.01); *G02F 2001/133626* (2013.01)

(58) Field of Classification Search
CPC .... G02B 6/005; G02B 6/0055; G02B 6/0028; G02B 6/0018; G02B 6/0031; G02B 6/0036; G02B 6/0088; G02B 6/0063; G02B 6/0073; G02B 6/0043; G02B 6/0001; G02B 6/0013; G02B 6/0016; G02B 6/0025; G02B 6/4214; G02B 27/0101; G02B 27/0172; G02B 27/0176; G02B 27/22; G02B 2027/0123; G02B 2027/0134; G02B 23/02; G02F 1/1336; G02F 1/133602; G02F 1/133606; G02F 1/1335; G02F 1/133504; G02F 1/133524; G02F 1/133528; G02F 1/133514; G02F 1/133553; G02F 1/133615; G02F 1/133526; G02F 1/133611; G02F 1/1333; G02F 1/133603; G02F 1/1343; G02F 1/136; G02F 1/1362; G02F 1/1368; G02F 2001/133507; G02F 2001/133607; G02F 2203/02; F21Y 2115/10; F21Y 2103/10; F21V 5/005; F21V 7/0016; F21V 7/0091; F21V 7/00; F21V 7/10; F21K 9/61
See application file for complete search history.

(56) References Cited

U.S. PATENT DOCUMENTS

| | | |
|---|---|---|
| 2015/0346550 A1 | 12/2015 | Wang |
| 2016/0018582 A1 | 1/2016 | Fiorentino et al. |
| 2016/0349438 A1 | 12/2016 | Ma et al. |

FOREIGN PATENT DOCUMENTS

| | | |
|---|---|---|
| CN | 104880760 A | 9/2015 |
| CN | 105074322 A | 11/2015 |
| CN | 205484147 U | 8/2016 |
| JP | 2008-300206 A | 12/2008 |
| WO | 2012/144471 A1 | 10/2012 |

\* cited by examiner

DISPLAY DEVICE AND CONTROLLING METHOD

TECHNICAL FIELD

Embodiments of the present invention relate to a display device and a controlling method.

BACKGROUND

In recent years, with the development of display devices, users have higher and higher requirements on the performance of the display device, for instance, more and more requirements on peep-proof.

Currently, as the display device has wider viewing angle in space, the information security may be affected. For instance, some users may read some secret information in public places, and the information displayed on the display device may be viewed by other people around due to large viewing angle of the display device, resulting in adverse consequences.

SUMMARY

Embodiments of the present disclosure provide a display device and a controlling method, which can achieve peep-proof effect while increasing the utilization rate of light.

In order to achieve the above objectives, embodiments of the present disclosure adopt technical solutions as below.

On one aspect, a display device is provided, including a display panel, the display panel includes a first substrate, a second substrate and a plurality of display units, wherein a first light source is disposed on one side of the first substrate; light emitted by the first light source is incident onto the first substrate and propagated in the first substrate in a manner of total reflection; and a light adjusting structure is disposed on a surface of the first substrate close to the second substrate, and is configured to reduce a divergence angle of light emitted by each of the display units of the display panel.

In an example, the display device further includes a second light source disposed on a surface of the first substrate far away from the second substrate.

In an example, the light adjusting structure includes a plurality of microstructures; each of the microstructures includes a grating surface and a groove surface; an acute angle is formed between the grating surface and the groove surface; and the divergence angle of the light emitted by each of the display units of the display panel can be changed by adjusting the acute angle between the grating surface and the groove surface and by adjusting a spacing between adjacent groove surfaces.

In an example, each of the microstructures is striped and corresponds to one row of display units of the display panel.

In an example, the display device further includes a reflection structure disposed on a surface of the first substrate at which the total reflection is occurred; wherein the reflection structure and the light adjusting structure are not overlapped on the surface of the first substrate close to the second substrate.

In an example, the display device further includes a liquid crystal layer disposed between the first substrate and the second substrate; and a polarizer disposed on a surface of the second substrate far away from the liquid crystal layer, wherein the light adjusting structure is configured to allow a polarization state of light emitted through the light adjusting structure to be perpendicular to a transmission axis of the polarizer.

In an example, the display device further includes a second light source disposed on a surface of the first substrate far away from the second substrate; the second light source is configured to emit linearly polarized light, wherein a polarization state of the linearly polarized light is perpendicular to the transmission axis of the polarizer.

In an example, the first substrate includes a first transparent base substrate and display elements, the display elements are disposed on the first transparent base substrate and located at the display units respectively; the first light source is disposed on a side surface of the first transparent base substrate; and the light adjusting structure is disposed on a surface of the first transparent base substrate close to the liquid crystal layer.

In an example, each of the display elements includes a thin-film transistor (TFT) and a pixel electrode electrically connected with a drain electrode of the TFT.

In an example, the second substrate includes a second transparent base substrate and filter patterns, the filter patterns are disposed on the second transparent base substrate and located at the display units respectively.

On the other aspect, a method of controlling the above-mentioned display device is provided, including: in a peep-proof mode, controlling the first light source to turn on while controlling the second light source to turn off; and in a normal mode, controlling the first light source to turn off while controlling the second light source to turn on.

Embodiments of the present invention provide a display device and a controlling method. By disposing a light adjusting structure on a first substrate and disposing a first light source on a side of the first substrate to allow light emitted by the first light source propagating in the first substrate in a manner of total reflection, when the light arrives at the light adjusting structure on the first substrate, the direction of the light may be changed by the light adjusting structure so that the divergence angle of the light emitted from each of display units can be reduced upon the adjustment of the light adjusting structure. Thus, a viewing angle of the display device can be reduced, and a peep-proof effect can be achieved. In addition, the light emitted by the first light source of the display device will be emitted through the light adjusting structure during propagating in the first substrate in a manner of total reflection, so that a utilization rate of the light emitted by the first light source can be improved.

BRIEF DESCRIPTION OF THE DRAWINGS

Hereafter, the embodiments of the present invention will be described in a more detailed way with reference to the accompanying drawings, so as make one person skilled in the art be able to understand the present invention more clearly, wherein.

Figure 1:
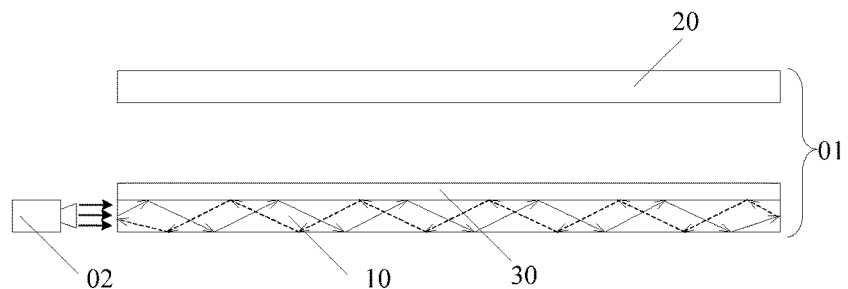
FIG. 1 is a first schematic structural view of a display device provided by an embodiment of the present invention.

Reference numerals of the accompanying drawings:

01—display panel; 02—first light source; 03—second light source; 10—first substrate; 101—first transparent base substrate; 102—display element; 20—second substrate; 201—second transparent base substrate; 202—filter pattern; 30—light adjusting structure; 301—microstructure; 302—grating surface; 303—groove surface; 40—display unit; 50—reflection structure; 60—liquid crystal layer; 70—polarizer.

DETAILED DESCRIPTION

Hereafter, the technical solutions in the embodiments of the present disclosure will be described in a clearly and fully understandable way in connection with the drawings in the embodiments of the present disclosure. It is obvious that the described embodiments are just a part but not all of the embodiments of the disclosure. Based on the described embodiments herein, one person skilled in the art can obtain other embodiment(s), without any inventive work, which should be within the scope of the disclosure.

Unless otherwise defined, the technical terminology or scientific terminology used herein should have the same meaning as commonly understood by one of ordinary skill in the art to which this invention belongs. Likewise, terms like "first," "second," etc., which are used in the description and the claims of the present application for invention, are not intended to indicate any sequence, amount or importance, but distinguish various components. The phrases "connect", "connected", etc., are not intended to define a physical connection or mechanical connection, but may include an electrical connection, directly or indirectly. "On," "under," "left," "right" or the like is only used to describe a relative positional relationship, and when the absolute position of a described object is changed, the relative positional relationship might also be changed accordingly.

The embodiment of the present invention provides a display device. As illustrated in FIG. 1, the display device includes a display panel 01 which includes a first substrate 10 and a second substrate 20. A first light source 02 is disposed on one side of the first substrate 10. Light emitted by the first light source 02 is incident onto the first substrate 10 and propagated in the first substrate 10 in a manner of total reflection (as illustrated by arrows in the first substrate in FIG. 1)

The display device further includes a light adjusting structure 30. The light adjusting structure 30 is disposed on a surface of the first substrate 10 close to the second substrate 20, and is configured to reduce a divergence angle of light emitted from each of the display units of the display panel 01, so as to reduce an viewing angle of the display device.

It should be noted that, firstly, the type of the display panel 01 is not specifically defined in the embodiments of the present invention, as long as the display panel is of passive emission type.

Secondly, the first light source 02 may be disposed on one side of the first substrate 10, and may also be respectively disposed on a plurality of sides of the first substrate 10. In one example, in order to simplify the structure of the display device, the first light source 02 is only disposed on one side of the first substrate 10. Herein, all the surfaces of the first substrate 10 may be referred to as a "side/side surface" except a light-emitting surface and a plane parallel to the light-emitting surface.

The first light source 02 is not specifically defined in the embodiments of the present invention, for instance, it may be a light-emitting diode (LED).

For instance, the light emitted by the first light source 02 may be parallel light. In this case, by adjustment of an angle of the parallel light with respect to a side surface of the first substrate 10, the parallel light emitted by the first light source 02 can be propagated in the first substrate 10 in a manner of total reflection upon being incident onto the first substrate 10. Moreover, for instance, the light emitted by the first light source 02 may be divergent light with certain angle. In this case, by adjustment of the angle of outermost light of the divergent light with respect to the side surface of the first substrate 10, the outermost light of the first light source 02 can be propagated in the first substrate 10 in a manner of total reflection upon being incident onto the first substrate 10. As the outermost light, having a minimum angle with respect to the side surface of the first substrate 10 among the divergent light emitted by the first light source 02, can be propagated in a manner of total reflection upon being incident onto the first substrate 10, all the other light of the divergent light can be the same.

Herein, as illustrated in FIG. 1, the light emitted from the first light source 02, for instance, may be propagated in a base substrate of the first substrate 10 in a manner of total reflection, or, may be propagated in one of layers disposed on the base substrate in a manner of total reflection. Thus, the total reflection not only can be implemented on upper and lower surfaces of a corresponding medium (e.g., the base substrate) but also can be implemented on a side surface of the corresponding medium.

Thirdly, the light adjusting structure 30 is disposed on a corresponding medium (e.g., the base substrate) at which the total reflection is occurred in the first substrate 10, on a surface close to the second substrate 20.

The light adjusting structure 30 may be any structure formed on the basis of optical diffraction principle. The direction of emergent light passing through the light adjusting structure 30 will be changed, so that the divergence angle of the emergent light can be reduced.

Fourthly, FIG. 1 only illustrates a corresponding medium layer at which the total reflection is occurred in the first substrate 10 and the light adjusting structure 30 disposed on a surface of the medium layer close to the second substrate 20. Other parts uncorrelated with the present disclosure are omitted.

In the embodiment of the present invention, the light adjusting structure 30 is disposed on the first substrate 10; the first light source 02 is disposed on one side of the first substrate 10, and the light emitted by the first light source 02 is propagated in the first substrate 10 in a manner of total reflection; when the light arrives at the light adjusting structure 30 on the first substrate 10, the direction of the light may be changed by the light adjusting structure 30, so that the divergence angle of the light emitted from each of the display units can be reduced upon the adjustment of the light adjusting structure 30. Thus, the viewing angle of the display device can be reduced, and the peep-proof effect can be achieved. In addition, the light emitted by the first light source 02 of the display device will be emitted through the light adjusting structure 30 during propagating in the first substrate 10 in a manner of total reflection, so that the utilization rate of the light emitted by the first light source 02 can be improved.

Figure 2:
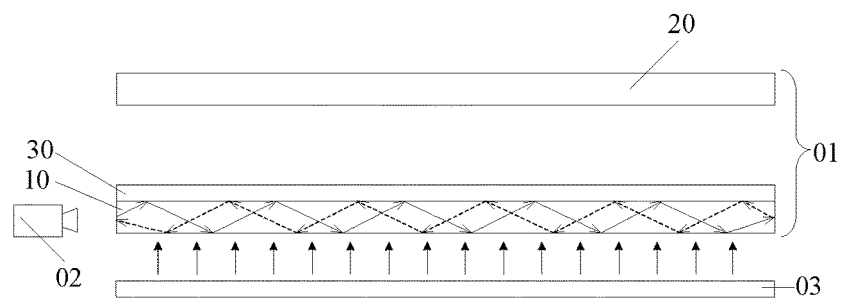
FIG. 2 is a second schematic structural view of the display device provided by the embodiment of the present invention.

In one example, as illustrated in FIG. 2, the display device may further include a second light source 03 disposed on a surface of the first substrate 10 far away from the second substrate 20.

The second light source 03 is not specifically defined in the embodiments of the present invention, for instance, it may be an LED. Light emitted by the second light source 03 may be light perpendicular to the first substrate 10 as illustrated in FIG. 2, and may also be divergent light.

With above arrangement of the second light source 03, the embodiment of the present invention provides a display device capable of switching between peep-proof display and normal display by controlling the operation of the first light source 02 and the second light source 03. That is to say, the display device can achieve peep-proof display by controlling the first light source 02 to turn on while controlling the second light source 03 to turn off; or, the display device can achieve normal display by controlling the first light source 02 to turn off while controlling the second light source 03 to turn on. On this basis, different display modes may be selected according to user demands, so that the application scope of the display device can be widened.

Figure 3A:
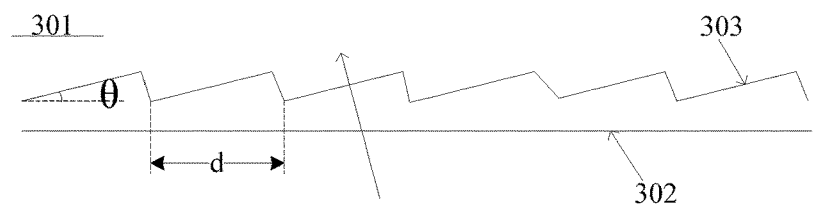
FIG. 3A is a first schematic structural view of a microstructure in the display device provided by the embodiment of the present invention.
Figure 3B:
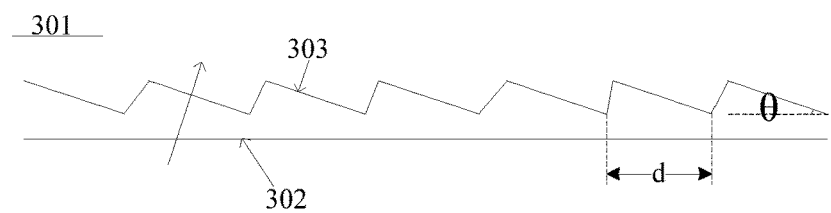
FIG. 3B is a second schematic structural view of the microstructure in the display device provided by the embodiment of the present invention.

In one example, the light adjusting structure 30 includes a plurality of microstructures 301. As illustrated in FIGS. 3A and 3B, each of the microstructures includes a grating surface 302 and a groove surface 303. An acute angle $\theta$ is formed between the grating surface 302 and the groove surface 303. The divergence angle of the light emitted from each of the display units of the display panel can be reduced by configuring an acute angle $\theta$ between the groove surface 303 and the grating surface 302 in each of the microstructures and by configuring a spacing d between adjacent groove surfaces 303.

In the example, each of the microstructures 302 extracts incident light by means of optical diffraction. When the incident light is perpendicular to the groove surface 303 and satisfies $2d \cdot \sin \theta = \lambda$, the emergent light that is perpendicular to the groove surface 303 possesses the maximum energy for it's at the central principal maximum position of diffracted light of a single groove surface; that is, light beams with such wavelength will be emitted upon being blazed and reinforced at a specific angle (an angle perpendicular to the groove surface), and light emitted through the microstructures 302 is always linearly polarized light. Different emergence angles and light-emitting wave bands can be obtained by allocating different values to d and to $\theta$.

Figure 4:
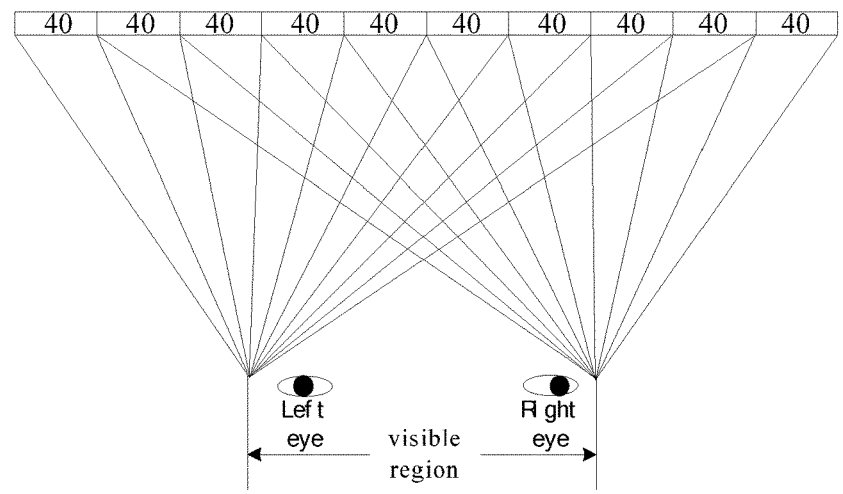
FIG. 4 is a schematic diagram illustrating the principle of peep-proof display of the display device provided by the embodiment of the present invention.

For instance, the emergence direction of the light passing through the microstructure 301 may be adjusted by configuring the acute angle $\theta$ between the grating surface 302 and the groove surface 303; in this way, the divergence angle of the emergent light from the display unit 40 can be reduced. As illustrated in FIG. 4, the divergence angle of the emergent light from the display unit 40 may allow to cover an interpupillary distance range suitable for the human eyes with positive viewing angle and comfortable viewing distance, and may also allow to cover two or a plurality of interpupillary distance ranges for the human eyes with positive viewing angle and comfortable viewing distance. Such structure widens the visible range.

In the example, the acute angle $\theta$ between the grating surface 302 and the groove surface 303 in each of the microstructures 301 or between two adjacent microstructures 301 may not be exactly the same, so the direction of the emergent light can be adjusted, and the divergence angle of the light emitted from each of the display units 40 all can be reduced.

In addition, as known from the formula $2d \cdot \sin \theta = \lambda$, the wavelength $\lambda$ of the emergent light is relevant to the spacing d between adjacent groove surfaces 303 and relevant to the acute angle $\theta$ between the grating surface 302 and the groove surface 303. Given that the acute angle $\theta$ between the grating surface 302 and the groove surface 303 is unchanged, the wavelength $\lambda$ of the emergent light obtained by adjustment of a certain microstructure 301 may not be exactly the same by adjustment of the spacing d between adjacent groove surfaces 303 in each of the microstructures 301, so that the emergent light with different wavelengths can be overlapped to form white light.

In the embodiment of the present invention, when the incident light is perpendicular to the groove surface 303, light beams can be emitted upon being blazed and reinforced; as a result, the direction of the emergent light can be adjusted by adjustment of the acute angle $\theta$ between the groove surface 303 and the grating surface 302 in each of the microstructures, and the emergent light can be emitted with blazed and reinforced. Thus, the light energy as output can be concentrated while reducing the divergence angle of the light emitted from each of the display units 40, which ensures the brightness of the emitted light. On this basis, the emergent light with different wavelengths can be overlapped to form white light by configuring the spacing d between adjacent groove surfaces 303.

Figure 5:
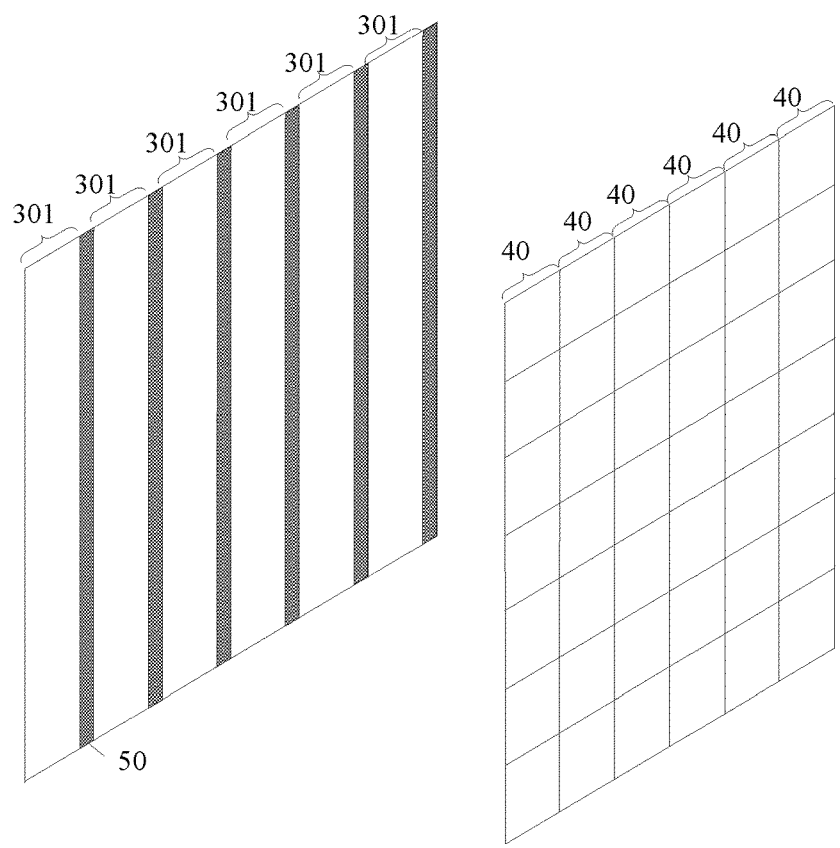
FIG. 5 is a schematic diagram illustrating the corresponding relationship between the microstructures and display units in the display device provided by the embodiment of the present invention.

In one example, as illustrated in FIG. 5, each of the microstructures 301 is stripped and corresponds to one row of display units in the display panel. For instance, a dimension of the stripped microstructure 301 may be as same as an overall dimension of the corresponding row of display units in the display panel. As used herein, "one row of display units" refers to a plurality of display units 40 arranged in a row along the vertical direction. When the microstructure 301 is configured to be striped and the dimension of the microstructure corresponds to that of one row of display units, the manufacturing process of the microstructure 301 can be simplified.

In one example, as illustrated in FIG. 5, the display device further includes a reflection structure 50 disposed on a surface of the first substrate 10 at which the total reflection is occurred. The reflection structure 50 and the light adjusting structure 30 are not overlapped on a surface of the first substrate 10 close to the second substrate 20.

The reflection structure 50 is not specifically defined in the embodiment of the present invention, for instance, it may be a layer with high reflectivity. The reflection structure 50 is disposed on a surface of the first substrate 10, and the light incident onto the reflection structure 50 is always reflected.

In the example, the reflection structure 50 and the light adjusting structure 30 are not overlapped on the surface of the first substrate 10 close to the second substrate 20; the light emitted from the first light source 02 is propagated in a manner of total reflection upon incident onto the reflection structure 50, and is emitted at a direction adjusted by the light adjusting structure 30 upon incident onto the light adjusting structure 30.

In the embodiment of the present invention, by arrangement of the reflection structure 50, the light emitted from the first light source 02 all can be propagated in a manner of total reflection in the first substrate 10. On this basis, the light will be emitted through the light adjusting structure 30 during propagating in the first substrate 10 in a manner of total reflection, so that the utilization rate of the light can be improved.

Figure 6:
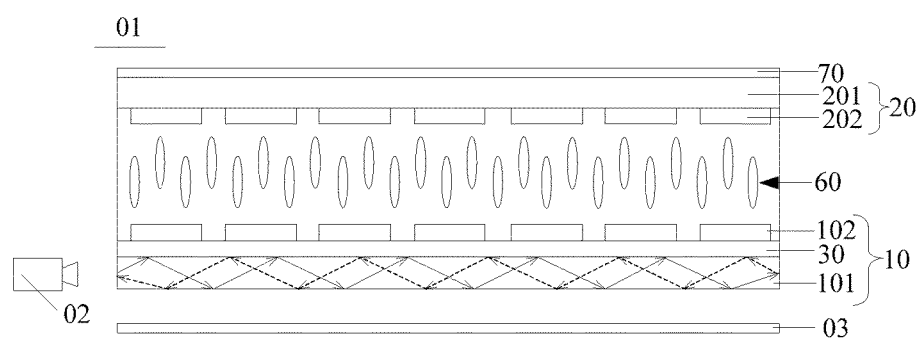
FIG. 6 is a third schematic structural view of the display device provided by the embodiment of the present invention.

In one example, as illustrated in FIG. 6, the display device further includes a liquid crystal layer 60 disposed between the first substrate 10 and the second substrate 20, and a polarizer 70 disposed on a surface of the second substrate 20 far away from the liquid crystal layer 60. A polarization state of the light emitted through the light adjusting structure 30 is perpendicular to a transmission axis of the polarizer 70. On this basis, when the display device further includes the second light source 03, the second light source 03 is configured to emit linearly polarized light, and a polarization state of the linearly polarized light is perpendicular to the transmission axis of the polarizer 70.

In a liquid crystal display (LCD), the polarizer serves to convert circularly polarized light source of natural light into linearly polarized light source, and absorbs light with polarization direction parallel to an absorption axis thereof, without substantially weakening the light with polarization direction parallel to a transmission axis thereof. The natural light that is polarized in various directions is converted into polarized light with vibration direction parallel to the direction of the transmission axis, upon passing through the polarizer. The penetration of the light can be controlled by addition of liquid crystal molecules with twisting property between two polarizers with transmission axis directions perpendicular to each other, so as to achieve image display.

In the embodiment of the present invention, the first light source 02 may emit linearly polarized light by adjustment of the light adjusting structure 30; the second light source 03 may directly emit linearly polarized light; and both the polarization state of the linearly polarized light emitted upon the adjustment of the light adjusting structure 30 and the polarization state of the linearly polarized light emitted by the second light source 03 are perpendicular to the transmission axis of the polarizer 70 disposed on the surface of the second substrate 20 far away from the liquid crystal layer 60. Therefore, it's not necessary for the polarizer 70 to be disposed on a surface of the first substrate 10 far away from the liquid crystal layer 60, which simplifies the manufacturing process of the display device. Moreover, the display device as manufactured can be thinner for omitting one layer of polarizer.

In one example, as illustrated in FIG. 6, the first substrate 10 includes a first transparent base substrate 101, and display elements 102 disposed on the first transparent base substrate 101 at the display units respectively; the first light source 02 is disposed on one side of the first transparent base substrate 101; and the light adjusting structure 30 is disposed on a surface of the first transparent base substrate 101 close to the liquid crystal layer 60.

For instance, the first transparent base substrate 101 may be a glass substrate.

It should be noted that the light adjusting structure 30 is disposed on the surface of the first transparent base substrate 101 close to the liquid crystal layer 60, and the display element 102 may be directly contacted with the light adjusting structure 30 or connected with the light adjusting structure 30 through a transition structure disposed therebetween, which may be particularly configured according to actual conditions.

For instance, the display element 102 is a necessary structure for the display unit disposed on the first substrate 10, and is formed by layers of patterns. The first substrate 10 includes a plurality of display elements 102.

In one example, the display element 102 includes a thin film transistor (TFT). The TFT includes a gate electrode, a gate insulating layer, a semiconductor active layer, a source electrode and a drain electrode, in which the drain electrode is electrically connected with a pixel electrode. The material of forming the pixel electrode may be, for instance, indium tin oxide (ITO), indium zinc oxide (IZO), etc. The TFT is a semiconductor unit with switching characteristic, and may be of top-gate type or bottom-gate type.

In one example, the display element 102 further includes a common electrode.

As for an in-plane switching (IPS for short) mode array substrate, pixel electrodes and common electrodes are arranged in the same layer and spaced from each other, and both are formed as strip electrodes; and as for an advanced super dimension switch (ADS for short) mode array substrate, pixel electrodes and common electrodes are arranged in different layers, in which electrodes disposed at upper locations are strip electrodes and electrodes disposed at lower locations are plate electrodes or strip electrodes.

In one example, the second substrate 20 includes a second transparent base substrate 201, and filter patterns which are disposed on the second transparent base substrate 201 and located at the display units respectively.

For instance, the filter patterns may be red filter patterns, green filter patterns, blue filter patterns, or filter patterns of other three primary colors.

In the embodiment of the present invention, compared with the case where the filter patterns 202 are disposed on the first substrate 10, the arrangement of the filter patterns 202 on the second substrate 20 can simplify the manufacturing process of the first substrate 10.

The embodiments of the present invention further provide a controlling method of the display device, including: in peep-proof display mode, controlling the first light source 02 to turn on while controlling the second light source 03 to turn off; and in normal display mode, controlling the first light source 02 to turn off while controlling the second light source 03 to turn on.

The embodiments of the present invention provide two display modes, namely the peep-proof display mode and the normal display mode. Users may select the display mode as required.

When the peep-proof mode is selected, the first light source 02 is turned on and the second light source 03 is turned off. At this point, light emitted by the first light source 02 passes through the display units 40 of the display panel upon being adjusted by the light adjusting structure 30, so as to reduce the divergence angle of the emergent light. In this way, the viewing angle of the display device can be reduced, and the peep-proof effect can be achieved.

When normal display is selected, the first light source 02 is turned off and the second light source 03 is turned on. If light emitted by the second light source 03 is perpendicular to the first substrate 10, the perpendicular light directly passes through the light adjusting structure 30 and then is emitted along the original direction. At this point, the light adjusting structure 30 does not change the direction of the light; and in case that the light emitted by the second light source 03 is divergent light, the light adjusting structure 30 still does not change the direction of the light, from the macroscopic view, even when the light passes through the light adjusting structure 30, because the light runs in every direction. On this basis, the display device doesn't function for peep-proof and can achieve normal display.

The display device provided by the embodiment of the present invention may be implemented with any passive emission type product or component with display function such as mobile phone, tablet PC, displayer, notebook computer and digital picture frame.

It shall be understood by those skilled in the art that: all or partial steps for implementing the method embodiments above may be completed by hardware relevant to program instructions. The programs may be stored in a computer-readable storage medium. When executed, the program performs the steps in the method embodiments. The storage medium includes various media capable of storing program codes such as read-only memory (ROM), random-access memory (RAM), disk or compact disc (CD).

Obviously, various modifications and deformations can be made to the present invention by those skilled in the art without departing from the spirit and scope of the present invention. Therefore, the present invention is intended to include the modifications and deformations fallen within the scope of the appended claims and equivalents thereof.

The present application claims the benefits of Chinese patent application No. 201610012078.4 filed with the SIPO on Jan. 8, 2016, which is incorporated herein by reference as part of the application.

The invention claimed is:

1. A display device, comprising a display panel, the display panel comprises a first substrate, a second substrate and a plurality of display units, wherein
    a first light source is disposed on one side of the first substrate; light emitted by the first light source is incident onto the first substrate and propagated in the first substrate in a manner of total reflection; and
    a light adjusting structure is disposed on a surface of the first substrate close to the second substrate, and is configured to reduce a divergence angle of light emitted by each of the display units of the display panel.

2. The display device according to claim 1, further comprising a second light source disposed on a surface of the first substrate far away from the second substrate.

3. The display device according to claim 1, wherein the light adjusting structure comprises a plurality of microstructures; each of the microstructures comprises a grating surface and a groove surface; an acute angle is formed between the grating surface and the groove surface; and the divergence angle of the light emitted by each of the display units of the display panel can be changed by adjusting the acute angle between the grating surface and the groove surface and by adjusting a spacing between adjacent groove surfaces.

4. The display device according to claim 3, wherein each of the microstructures is striped and corresponds to one row of display units of the display panel.

5. The display device according to claim 1, further comprising a reflection structure disposed on a surface of the first substrate at which the total reflection is occurred, wherein
    the reflection structure and the light adjusting structure are not overlapped on the surface of the first substrate close to the second substrate.

6. The display device according to claim 1, further comprising: a liquid crystal layer disposed between the first substrate and the second substrate; and a polarizer disposed on a surface of the second substrate far away from the liquid crystal layer, wherein
    the light adjusting structure is configured to allow a polarization state of light emitted through the light adjusting structure to be perpendicular to a transmission axis of the polarizer.

7. The display device according to claim 6, further comprising a second light source disposed on a surface of the first substrate far away from the second substrate, the second light source is configured to emit linearly polarized light, wherein
    a polarization state of the linearly polarized light is perpendicular to the transmission axis of the polarizer.

8. The display device according to claim 1, wherein the first substrate comprises a first transparent base substrate and display elements, the display elements are disposed on the first transparent base substrate and located at the display units respectively;
    the first light source is disposed on a side surface of the first transparent base substrate; and
    the light adjusting structure is disposed on a surface of the first transparent base substrate close to the liquid crystal layer.

9. The display device according to claim 8, wherein each of the display elements comprises a thin-film transistor (TFT) and a pixel electrode electrically connected with a drain electrode of the TFT.

10. The display device according to claim 9, wherein the second substrate comprises a second transparent base substrate and filter patterns, the filter patterns are disposed on the second transparent base substrate and located at the display units respectively.

11. A controlling method of a display device, the display device comprises a display panel, the display panel comprises a first substrate, a second substrate and a plurality of display units, wherein, a first light source is disposed on one side of the first substrate; light emitted by the first light source is incident onto the first substrate and propagated in the first substrate in a manner of total reflection; and a light adjusting structure is disposed on a surface of the first substrate close to the second substrate, and is configured to reduce a divergence angle of light emitted by each of the display units of the display panel; and wherein a second light source is disposed on a surface of the first substrate far away from the second substrate,
    the controlling method comprises:
    in a peep-proof mode, controlling the first light source to turn on while controlling the second light source to turn off; and
    in a normal mode, controlling the first light source to turn off while controlling the second light source to turn on.

* * * * *